United States Patent [19]

Hida

[11] Patent Number: 4,957,885

[45] Date of Patent: * Sep. 18, 1990

[54] PROCESS FOR MAKING A SILICON CARBIDE COMPOSITION

[75] Inventor: George T. Hida, Tonawanda, N.Y.

[73] Assignee: Benchmark Structural Ceramics Corporation, Amherst, N.Y.

[*] Notice: The portion of the term of this patent subsequent to Aug. 14, 2007 has been disclaimed.

[21] Appl. No.: 339,137

[22] Filed: Apr. 14, 1989

Related U.S. Application Data

[63] Continuation-in-part of Ser. No. 254,175, Oct. 6, 1988.

[51] Int. Cl.$^5$ ............................................. C04B 35/56
[52] U.S. Cl. ........................................ 501/89; 501/95; 264/66
[58] Field of Search ........................ 501/89.95; 264/66

[56] References Cited

U.S. PATENT DOCUMENTS

| | | | |
|---|---|---|---|
| 1,918,317 | 7/1933 | Benner et al. | 501/88 |
| 2,854,364 | 9/1958 | Lely | 148/1.5 |
| 2,862,795 | 12/1958 | Lowe | 23/208 |
| 2,886,454 | 5/1959 | Todd | 106/43 |
| 3,375,073 | 3/1968 | McMullen | 23/204 |
| 3,704,230 | 11/1972 | Loricchio | 252/182 |
| 4,069,060 | 1/1978 | Hayashi et al. | 106/65 |
| 4,284,612 | 8/1981 | Horne, Jr. et al. | 423/345 |
| 4,778,778 | 10/1988 | Mallia et al. | 501/96 |

OTHER PUBLICATIONS

"Study of Solid-State Aluminothermal Reactions: Influence of Activation and Moderation Processes" George T. Hida (Thesis, Israel Institute of Technology, Haifa, Israel, Apr. 1987).

Primary Examiner—Mark L. Bell
Assistant Examiner—Deborah Jones
Attorney, Agent, or Firm—Howard J. Greenwald

[57] ABSTRACT

A process for preparing a ceramic composite with improved properties is disclosed. A material which contains at least 85 percent of a mixture of silicon carbide and alumina is heated to a temperature of from about 350 to about 500 degrees centigrade and, after it reaches this temperature, maintained there for at least 5 minutes. Thereafter, the temperature of the material is raised to 1,250–1,350 degrees centigrade and, after reaching this temperature, the material is maintained there under a pressure of from about 5 to about 15 p.s.i. for at least 30 minutes. Thereafter, the temperature of the material is raised to 1,650–1,750 degrees centigrade, and it is thereafter maintained at such temperature for from about 30 to about 90 minutes.

16 Claims, 2 Drawing Sheets

PROCESS FOR MAKING A SILICON CARBIDE COMPOSITION

CROSS REFERENCE TO RELATED APPLICATION

This is a continuation-in-part of applicant's copending application U.S. Ser. No. 254,175, filed Oct. 6, 1988.

FIELD OF THE INVENTION

A process for heat treating a ceramic composite which is comprised of silicon carbide whiskers and alumina powder.

BACKGROUND OF THE INVENTION

Ceramic composites comprised of silicon carbide whiskers and alumina powder are well known to prior art. Thus, by way of illustration, U.S. Pat. No. 4,543,345 discloses a silicon carbide whisker-alumina ceramic composite with good fracture toughness. U.S. Pat. No. 4,652,413 discloses that silicon carbide whisker-reinforced alumina ceramic articles are useful as structural materials for the fabrication of turbocharger rotors, cylinders, bearings, and other components of heat engines.

One problem with the ceramic composites presently available is that they cost from about twenty to about fifty dollars per pound, a price which makes them too expensive for certain applications.

In 1987, applicant George T. Hida disclosed a process for preparing a silicon carbide-whisker/alumina composite. In his Ph.D. Thesis, which was entitled "Study of Solid-State Aluminothermal Reactions: Influence of Activation and Moderation Processes," which was submitted to the senate of the Technicron—Israel Institute of Technology in Haifa, Israel in Feb. of 1987, and which was published in Apr. of 1987, a reaction was disclosed in which three moles of silica were reacted with four moles of aluminum and 3 moles of carbon. The silica reagent was 200/230 mesh fraction quartz sand; the aluminum reagent was −325 mesh aluminum powder; and the carbon reagent was carbon black. Stoichiometric amounts of these reagents were mixed, the mixture was compacted into pellets by cold pressing in a die, and the pressed pellets were placed into a furnace which had been preheated to 720 degrees centigrade and were thereafter ignited.

The process disclosed in Hida's 1987 thesis was a substantial improvement over prior art processes for preparing silicon carbide whisker/alumina composite materials. However, it did not reduce the cost of making the composite down to commerically suitable levels.

It is an object of this invention to provide a process for preparing a heat-treated silicon carbide whisker/alumina composite with improved properties at a cost which is substantially cheaper than is currently possible.

SUMMARY OF THE INVENTION

In accordance with this invention, there is provided a process for preparing a ceramic composite with improved properties. In the first step of the process, a material which contains from about 39 to about 54 percent of alpha silicon carbide and from about 46 to about 33 percent of alumina is provided. The material is heated to a temperature of from about 350 to about 500 degrees centigrade and, after it reaches such temperature, is maintained there for at least 5 minutes. Thereafter, the temperature of the material is raised to from about 1,250 to about 1,350 degrees centigrade and, after it reaches such temperature, is maintained there and under a pressure of from 5-15 p.s.i. for at least 30 minutes. Thereafter, the temperature of the material is raised to 1,650-1,750 degrees centigrade, and it is thereafter maintained at such temperature for from about 30 to about 90 minutes.

DESCRIPTION OF THE DRAWINGS

The present invention will be more fully understood by reference to the following detailed description thereof, when read in conjunction with the attached drawings, wherein.

DESCRIPTION OF THE PREFERRED EMBODIMENTS

Figure 1:
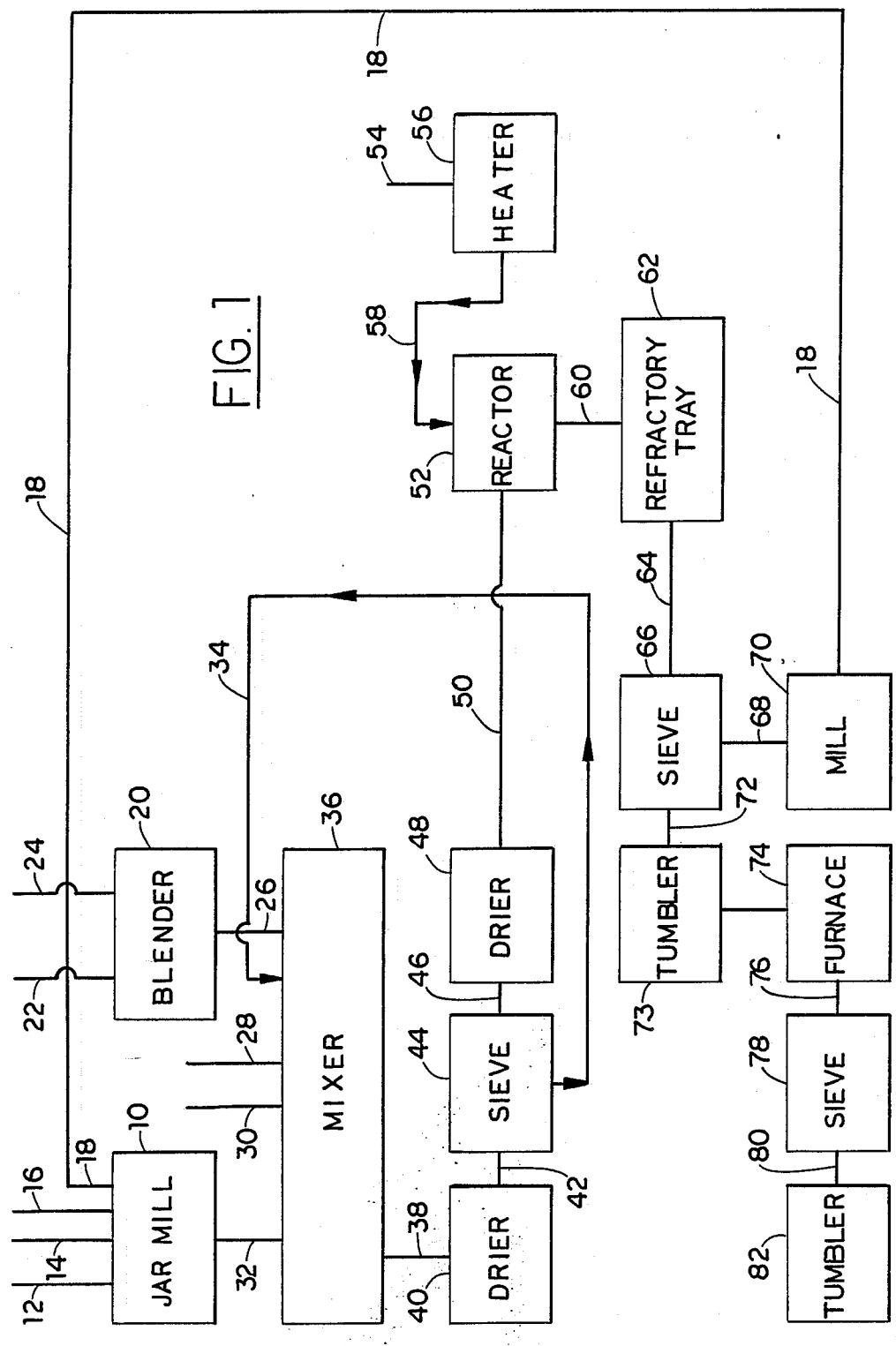
FIG. 1 is a flow sheet illustrating a preferred process of the invention.

In the first step of the process of this invention, a specified material is provided. This material is comprised of from about 39 to about 54 percent of alpha silicon carbide (by weight of silicon carbide and alumina), from about 46 to about 33 percent of alumina, and up to about 15 percent (by total weight of composite) of other materials. The silicon carbide is comprised of at least about 80 percent, by weight, of silicon carbide whiskers.

This starting material may be produced by the method described below.

METHOD FOR PRODUCING THE STARTING MATERIAL

In the method described below, a composite of alpha silicon carbide whiskers and alpha aluminum oxide is obtained by an aluminothermic reduction process followed by in situ synthesis of silicon carbide.

As used in this specification, the term whisker refers to a needle-like single crystal of metallic and nonmetallic compounds; this crystalline form possesses very good strength properties, approaching maximum theoretical strength, making it suitable for reinforcement of metal, ceramic, glass, or polymer matrices. The term silicon carbide whiskers, as used in this specification, refers to single crystals in needle-like form containing at least 90 weight percent of the alpha silicon carbide phase, having a diameter of from about 0.1 to about 3 microns, having a length of at least about 10 microns, and having an aspect ratio of less than about 1:10. The term aspect ratio is the ratio of the diameter (or the equivalent diameter) of the whisker, divided by its length, In one preferred embodiment, the aspect ratio of the whisker is less than about 1:20.

The silicon carbide whiskers comprising the composite of this invention can have different cross-sectional shapes. Thus, e.g., they may be circular, square, rectangular, hexagonal, and the like. When the whisker has a substantially circular cross-sectional shape, then its diameter will be from about 0.1 to about 3.0 microns and, preferably, from about 0.5 to about 1.5 microns. When the cross-sectional shape of the whisker is not substantially circular, then it will have an equivalent diameter of from about 0.1 to about 3.0 microns and, preferably, from about 0.5 to about 1.5 microns.

The silicon carbide whiskers comprising the composite of this invention consist essentially of alpha silicon carbide. As is known to those skilled in the art, the crystalline structure of silicon carbide derives from the diamond structure in which half of the carbon atoms are replaced by silicon atoms. Each atom is surrounded tetrahedrally by four different atoms and linked with them by covalent bonds. Alpha silicon carbide is a modification of the crystalline structure having a hexagonal crystalline network with several arrangements coexisting within the same conditions of temperature and pressure and called polytypes. See, e.g., pages 486 to 488 of R. Abramovici's "Materii Prime Ceramice," (Institutul Politechnic, Traian Vuia, Timisoara, Romania, 1974). Also see pages 366–367 of the McGraw-Hill Encyclopedia of Science & Technology, Volume 12 (McGraw-Hill Book Company, New York, 1977). The disclosure of these publications are hereby incorporated by reference into this specification.

The composite produced by the process of this invention is also comprised of alpha aluminum oxide. As used in this specification, the term alpha aluminum oxide refers to the most stable form of aluminum oxide which is also called "corundum". See, e.g., pages 331–332 of said Abramovici book.

THE MATERIALS USED IN THE PROCESS OF THE INVENTION

In the process of this invention, a multiplicity of pellets are prepared from a specified slurry. Each of these pellets, and the slurry from which they are prepared, have a specified ratio of silica, aluminum, and carbon, and they contain certain amounts of such silica, aluminum, and carbon. The materials used to prepare such slurry and pellets are described below.

The pellets and slurry used in the process of this invention contain from about 17 to about 22 weight percent of aluminum material selected from the group consisting of aluminum and aluminum alloy, by total weight of silica, aluminum, and carbon in the pellets. It is preferred that the pellets comprise from about 17.5 to about 19 weight percent of aluminum, by weight of silica, aluminum, and carbon.

The aluminum or aluminum alloy should be in powder form and will have a specific surface area of from about 0.2 to about 1.1 square meters per gram and, preferably, from about 0.6 to about 0.7 square meters per gram.

Either pure aluminum, aluminum alloy material, or mixtures thereof may be used. Suitable aluminum alloys include, for example, alloys of aluminum with lithium, silicon, magnesium, manganese, iron, and the like.

In one embodiment, the aluminum material used is in the form of fine aluminum flakes. Thus, by way of illustration, one may use fine aluminum flakes obtainable from the Riedel de Haen Company of West Germany (catalog number 110100). This material is a coated aluminum comprised of 94 percent aluminum and less than 0.1 percent of oxygen; and at least about 80 percent of these flakes are smaller than 9 microns.

In the pellets and slurry used in the process of this invention, the specified weight ratio of aluminum is based upon the concentration of pure aluminum. When an aluminum alloy material is used, or when a mixture of aluminum or aluminum alloy material is used, the aluminum content of the alloy is first calculated, and this aluminum content may then be used to determine the aluminum content of the pellet and/or the slurry.

The particle size distribution of the aluminum material will range from about 4 to about 28 microns and, preferably, will be from about 6 to about 12 microns. Particle size analysis may be conducted by means well known to those skilled in the art. Thus, for example, one can use the procedure described on pages 8-2 to 8-8 of Perry and Chilton's "Chemical Engineers' Handbook," Fifth Edition (McGraw-Hill Company, New York, 1973). The Perry and Chilton book also describes the specific surface area test described elsewhere in this specification (see, e.g., pages 8–7); the disclosure of the entire Perry and Chilton book is hereby incorporated by reference into this specification. Test methods are also described in the 1988 Annual Book of ASTM Standards, Section 02, Volume 02.05 (ASTM, 1916 Race Street, Philadelphia, Pa., 1988), the disclosure of which is hereby incorporated by reference into this specification.

At least about 80 weight percent of the aluminum particles will have diameters of from about 6 to about 12 microns. It is preferred that at least about 85 weight percent of the aluminum particles have a diameter of from about 6 to about 12 microns. In an even more preferred embodiment, at least about 90 weight percent of the aluminum particles have a diameter of from about 6 to about 12 microns.

In one embodiment, the aluminum material contains from about 0 to about 1.0 percent, by weight of aluminum material, of combined oxygen. As used in this specification, the term combined oxygen refers to oxygen which is combined with aluminum and/or aluminum alloy and, usually, is in the form of a metal oxide. The amount of combined oxygen is determined by evaluating the total oxygen present by conventional means such as, e.g., spectral analysis.

The pellets and the slurry used in the process of this invention are also comprised of amorphous carbon. These materials comprise from about 19 to about 24 weight percent, by total weight of silica, aluminum, and carbon, of amorphous carbon. It is preferred that they comprise from about 21 to about 24 weight percent of amorphous carbon, by total weight of silica, aluminum, and carbon.

By way of illustration, one can use carbon black obtained from the Pelleter Company of the United States (code "SRF") which has a specific surface area of 27.1 square meters per gram and is comprised of 99.28 percent of carbon, 0.37 percent of hydrogen, 0.03 percent of sulfur, 0.25 percent of ash, and 0.07 percent of oxygen. By way of further illustration, one can use amorphous carbon obtainable from the Aldrich Chemical Company, Inc. of 940 West Saint Paul Avenue, Milwaukee, Wis. and sold as code 27,720-7 in the 1988-1989 Aldrich catalog.

It is essential that the carbon used in the process of this invention be amorphous and have a specific surface area of at least about 4 square meters per gram. The specific surface area may be determined by means well known to those skilled in the art. Thus, for example, specific surface area, or the surface area per unit mass of material (square meters per gram) can be measured by using gas adsorption techniques via the well known BET equation. This measurement can be conducted on a Micromeritics Flow Sorb II 2300, model 2300/00000/00 (made by Micromertics Company, Norcross, Ga.). The test procedure is described in the instruction manual for this machine (see, e.g., Manual P/N: 230/42804/00 published by Micromeritics in 1985). As is known to those skilled in the art, this measurement also may be conducted on the Monosorb model MS-4 single point analyzer or the Quantosorb QS-7 multi-point analyzer, both of which are manufactured by the Quantachrome Corporation of 6 Aerial Way, Syosset, N.Y. 11791.

In one preferred embodiment, the amorphous carbon contains less than about 1.5 percent, by weight of carbon, of combined sulfur. The amount of combined sulfur may be determined by means well known to those skilled in the art. Thus, by way of illustration, one can use the combustion method described on pages 9-4 to 9-5 of said Perry and Chilton's "Chemical Engineers' Handbook."

The pellets and the slurry used in this invention are also comprised of from about 56 to about 65 weight percent of silica, by total weight of silica, aluminum, and carbon in the pellet. Preferably, these materials comprise from about 58 to about 61 weight percent of silica, by total weight of silica, aluminum, and carbon.

By way of illustration, a suitable silica which may be used in the process of this invention is "Cab-O-Sil M-5," Fumed Silica, an amorphous silicon dioxide manufactured by the Cabot Corporation, Cab-O-Sil Division, of Tuscola, Ill. 61953; this silica has a specific surface area of 200 plus or minus 25 square meters per gram; and the total oxygen content of this silica indicates that it contains less than 1.0 percent of silicon-silicon bonds.

The silica used in the process of this invention preferably has a specific surface area of from about 1.2 to about 400 square meters per gram and, more preferably, from about 50 to about 300 square meters per gram. In an even more preferred embodiment, the specific surface area of the silica is from about 125 to about 250 square meters per gram. In the most preferred embodiment, the silica has a specific surface area of from about 175 to about 225 square meters per gram.

The silica used can be either amorphous or crystalline. As used in this specification, the term amorphous refers to a solid substance which, although it may possess microcrystals, does not indicate the existence of any crystalline structure with X-ray diffraction. Even though the amorphous material may possess some degree of crytallinity, such crystallinity is less than that required for detection with X-ray diffraction technology. Thus, for example, a solid material which does not crystallize and which does not possess definite geometrical shape (as determined by X-ray diffraction analysis) is amorphous within the meaning of this invention.

The term crystalline, as used in this invention, indicates a substance which, when subjected to X-ray diffraction analysis, indicates the presence of crystals.

It is preferred that the silica used in the process of this invention be amorphous. It is also preferred that the silica contain less than about 1.0 percent, by total weight of silica, of silicon-silicon bonds. The extent to which the silica contains silicon-silicon bonds may be determined by analyzing the total oxygen content of the silica; to the extent, if any, that the total oxygen content is less than stoichiometric, silicon-silicon bonds are present, and the extent to which they are present can be calculated.

In one preferred embodiment, the pellets and the slurry of this invention are comprised of from about 1 to about 5 percent, by weight of silica, aluminum, carbon, of a source of carbon monoxide. This carbon monoxide source is designed to generate carbon monoxide when it is is subjected to a temperature of from about 700 to about 1,600 degrees Centigrade for no more than about 1.0 millisecond. Suitable sources of carbon monoxide include fatty acids containing from about 10 to about 24 carbon atoms and can be monocarboxylic or dicarboxylic. Suitable fatty acids include acids such as caprylic acid, capric acid, lauric acid, myristic acid, palmitic acid, stearic acid, oleic acid, linoleic acid, erucic acid, brasidic acid, elaidic acid, stearolic acid, mixtures thereof, and the like. Other sources of carbon monoxide include fats corresponding to said fatty acids.

Stearic acid is a preferred source of carbon monoxide. By way of illustation, one suitable stearic acid may be obtained from the Aldrich Chemical Company of 940 West Saint Paul Avenue, Milwaukee, Wis. (catalog number 17,536-6 of the 1986-1987 Aldrich catalog).

In one preferred embodiment, the pellets and the slurry used in the process of this invention are comprised of from about 1 to about 5 weight percent, by combined weight of silica, aluminmum, and carbon, of a source of hydrogen fluoride. In a more preferred embodiment, from about 2 to about 4 percent of the source of hydrogen fluoride is present. In the most preferred embodiment, about 3 percent of the source of hydrogen fluoride is present in the reaction mixture.

The source of hydrogen fluoride is designed to generate hydrogen fluoride when subjected to a temperature of from about 200 to about 400 degrees centigrade for from about 1 to about 20 minutes. Potassium hydrogen fluoride is a suitable source of hydrogen fluoride, and it may be obtained, e.g., from Alfa Products, Thiokol Ventron Division, 152 Andover Street, Danvers, Mass. (catalog number 89714). By way of illustration and not limitation, other suitable sources of hydrogen fluoride include any material which will contains the bifluor ion $[HF_2]$ such as, e.g., sodium hydrogen fluoride, ammonium hydrogen fluoride, and the like.

In one preferred embodiment, the pellets and the slurry of this invention are comprised of from about 0.1 to about 1.0 percent (by weight of silica, aluminum, carbon), of a metal-containing component selected from the group consisting of ferric oxide, ferro-ferric oxide, manganese dioxide, and titanium dioxide. It is preferred to use from about 0.5 to about 1.0 weight percent of this metal-containing component. In the most preferred embodiment, said component is selected from the group consisting of ferric oxide and manganese dioxide.

By way of illustration, one may use a ferric oxide obtained from the Research Organic/Inorganic Chemical Corp. of 9068 DeGarmo Street, Sun Valley, Calif. 913252.

In one especially preferred embodiment, the pellets and the slurry of this invention are comprised of the specified amounts of silica, aluminum, and carbon (each by total weight of pellet) and, additionally, the specified amounts of the source of carbon monoxide, the source of hydrogen fluoride, and the metal-containing component.

In one preferred embodiment, the pellets and the slurry are also comprised of a source of gaseous silicon carbide which, when exposed to the high-temperature generated during the reaction, will produce silicon carbide in the gaseous phase.

In one preferred embodiment, the sources of hydrogen fluroride and/or iron are first mixed with the carbon, and this mixture is thereafter mixed with the silica and the aluminum. In this embodiment, it is preferred to grind the carbon and the sources of hydrogen fluoride, and/or metal-containing component in a jar mill to homogenize the mixture and to slightly agglomerate them. Thus, for example, the mixture can be ground for from about 1 to about 2 hours with alumina grinding media.

The specified amounts of silica, aluminum, carbon, and sources of carbon monoxide, hydrogen fluoride, and metal-containing component are pelletized in order to prepare a multiplicity of pellets with a specified size. These pellets are substantially spherical, although other irregularly-shaped pellets also may be used. The pellets used in the process of this invention will preferably have a maximum dimension of about 12 millimeters, although pellets with larger maximum dimensions also can be used. The pellets used will have a minimum dimension of about 4 millimeters. Thus, in the preferred embodiment wherein spherical pellets are used, the diameter of these pellets will range from about 4 to about 12 millimeters and, preferably, from about 6 to about 10 millimeters.

THE PREFERRED PROCESS OF THE INVENTION

Referring to FIG. 1, a preferred process for preparing the pellets of this invention is disclosed. In this process, a specified slurry is first prepared, and it is thereafter pelletized.

In the first step of the process a slurry is provided which is comprised of from about 60 to about about 80 volume percent of solid material and from 40 to about 20 volume percent of non-aqueous liquid. The solid material in the slurry is comprised of from about 17 to about weight 22 percent of the aforementioned aluminum, from about 19 to about 24 weight percent of the aforementioned carbon, from about 56 to about 65 weight percent of the aforementioned silica, and from about 1 to about 5 weight percent of the aforementioned source of carbon monoxide.

The slurry provided in the first step of the process is prepared by a process involving the sequential steps of mixing a non-aqueous liquid with a source of carbon monoxide, mixing silica with the non-aqueous liquid/carbon monoxide source mixture to produce a silica slurry, mixing aluminum and carbon with the silica slurry, and drying the silica/alumina/carbon slurry thus produced to a solids content of from about 80 to about 92 volume percent.

The first step in making the slurry is to mix non-aqueous liquid with a source of carbon monoxide. The non-aqueous liquid preferably is readily volatile at a temperature of about 80 degrees Centigrade. This non-aqueous liquid may be either a flammable or nonflammable solvent.

It is preferred to use a non-aqeuous liquid which volatilizes at a temperature of about 60 degrees Centigrade.

Suitable flammable non-aqueous, solvents include acetone, benzene, toluene, n-petroleum ether, and the like. Thus, by way of illustration and not limitation, one can use the petroleum ethers identified as reagents 32,044-7, 26,173-4, 30,031-4, and 18,451-9 on page 1183 of the 1988-1989 Aldrich catalog. 200 milliliters of the petroleum ether may be charged to blender 20 via line 22.

In one embodiment, nonflammable, non-aqueous solvents are used. Such suitable solvents include carbon tetrachloride, carbon disulfide, and the like.

Referring to FIG. 1, a carbon agglomerate is milled in mill 10, the non-aqueous solvent/carbon monoxide source is mixed in blender 20, and the components of the slurry produced are fed via lines 26, 28, 30, and 32 to mixer 36.

A carbon agglomerate is prepared in jar mill 10. To jar mill 10 is fed amorphous carbon via line 12, ferric oxide via line 14, and potassium hydrogen fluoride via line 16. Other mills also can be used instead of jar mill 10; thus, e.g., one can use the mills described on pages 8-25 to 8-45 of said Perry and Chilton's handbook.

The carbon may be mixed with any source of metal-containing component used, any source of hydrogen fluoride used, and any moderator (described later on in this specification) used until a homogenous carbon agglomerate is obtained in mill 10. In this step, the carbon, the source of metal-containing component, and/or the source of hydrogen fluoride, and/or the moderator are ground in the mill. It is preferred to homogenize these materials for from about about 1 to about 2 hours in a jar mill with alumina grinding media. However, other grinding media, grinding devices, and grinding times can be used to obtain a similarly homogenized mixture. The homogenized carbon agglomerate mixture is characterized having a grey uniform color without any visible red spots or white spots.

One amorphous carbon which can be used in Huber Corporation's pelletized carbon black, type N990; 19 grams of such carbon can be charged to mill 10. One ferric oxide which can be used is Pfizer Corporation's synthetic iron oxide type R-2199; 0.5 grams of this ferric oxide can be charged to mill 10. One potassium hydrogen fluoride which can be used is Aldrich Corportion's reagent number 23,928-3 (also referred to as potassium bifluoride); 3.0 grams of this reagent can be charged to ball mill 10.

In one embodiment, a ground moderator (described later on) is fed to mill 10 via line 18; 10 grams of moderator can be fed to the mill. This moderator may contain about 0.1 percent (by weight of moderator) of fatty acid such as, e.g., oleic acid. It should be noted that the oleic acid, e.g., can act as both a moderator (added in mill 10) and/or a source of carbon monoxide (added in blender 20).

It is preferred that jar mill 10 contain sintered alumina grinding media. The reagents in jar mill 10 should be ground for about 2.0 hours at a speed of about 90 r.p.m. to produce a homogenous mixture which has a uniform grey color and no visible red or white spots.

The non-aqueous solvent/carbon monoxide source mixture is prepared in blender 20. Into blender 20 should be fed a non-aqueous solvent such as, e.g., petroleum ether via line 22. A fatty acid, such as stearic acid, may be fed into the blender via line 24. It is critical to prepare a non-aqueous solvent/stearic acid mixture prior to the time the silica is mixed with non-aqueous solvent.

One stearic acid which may be used is obtainable from Aldrich Corporation and is identified as reagent 17-536-6; 4 grams of this stearic acid may be charged to blender 20. The petroleum ether and the stearic acid may be blended at a speed of about 1500 r.p.m.

After the mixture of the non-aqueous liquid and stearic acid has been prepared in blender 20, it is thereafter mixed with silica.

All of the silica is mixed with a sufficient amount of the mixture of non-aqueous, solvent and stearic acid to prepare a well-dispersed silica slurry with a solids content of from about 35 to about 55 volume percent and, preferably, from about 40 to about 50 volume percent. The mixing may be effected by means well known to those skilled in the art. Thus, by way of illustration and not limitation, one may use any of the mixing processes and/or apparatuses described on pages 21-30 to 21-36 of Perry and Chilton's "Chemical Engineers' Handbook," Fifth Edition, supra, the disclosure of which is hereby incorporated by reference into this specification. Thus, e.g., one can mix the silica and the solvent with an Eirich mixer.

Those skilled in the art are familiar with the Eirich Machines and their use in mixing solids and/or pelletizing. Reference may be had, e.g., to an article entitled "Mixing Techniques and Mixing Equipment" first published in Aufberteitungs-Teklchnick 1976 and republished in publication 10052us-2000-683 by the Eirich Machines Ltd. of 521 Fifth Avenue, New York, N.Y., the disclosure of which is hereby incorporated by reference into this specification. Reference also may be had to other Eirich publications entitled "Eirich Intensive Mixers -The complete range of mixers" (GM 885-4us), "Eirich Intesnive Mixer for vacuum of pressure operation (Edition 35 e/486), "Eirich Type R Intensive Mixer," and the like. Each of these publications is hereby incorporated by reference into this specification.

The silica is preferably mixed with the non-aqueous liquid mixture for from about 10 to about 30 minutes until a well-mixed slurry is obtained.

Into mixer vessel 36 is fed the blend from blender 20 via line 26, silica via line 28, aluminum powder via line 30, the ground mixture from mill 10 via line 32, and recyled material via line 34. As used in this specification, the term recycled material refers to the material which passes through both of the pelletizing sieves and, thus, has a diameter of less than about 4 millimeters the recyled material is reintroduced into the slurry via line 34.

The petroleum ether mix from blender 20 is mixed with the silica prior the time any other reagents are contacted with either the silica or the petroleum ether mix; it is critical that the silica be mixed with non-aqueous solvent mixture prior to the time it is mixed with either the aluminum material and/or the carbon.

200 milliliters of the mix from blender 20 may be mixed with 60 grams of silica. A suitable silica introduced via line 28 is Cabot Corporation's Cab-0-Sil Fumed Silica Type M-5.

The mixing may occur in a mixer other than mixer vessel 36; in the embodiment shown in FIG. 1, the mixing occurs in mixer 36. Suitable mixers are described on pages 19-3 to 19-23 of said Perry and Chilton's handbook.

The petroleum ether mix and the silica should be mixed at a speed of about 160 r.p.m. for about 30 minutes until the silica is well dispersed.

After the well dispersed silica slurry has been prepared, it may be mixed with aluminum powder, which is added via line 30. A suitable aluminum powder is Alcoa Corporation's atomized aluminum powder grade 6401. 18 grams of the aluminum powder may be added via line 30 to the reaction mixture.

At the same time that the aluminum powder is added to the reaction mixture, or thereafter, the carbon mixture from mill 10 may be added through line 32 and/or the recycled material may be added through line 34. In general, up to about 20 grams of recycle may be added through line 34.

After the well-mixed silica/solvent slurry has been prepared, then the aluminum and the ground carbon agglomerate is added to the slurry. It is preferred to add these materials to the vessel in which the silica slurry is present. This vessel is preferably a closed vessel so that, during mixing of the slurry, volatile solvent does not escape from it.

The silica/aluminum/carbon agglomerate/solvent mixtures thus prepared is then preferably mixed in a closed vessel for at least about 2 hours and, preferably, from about 2 to about 4 hours. Any of the mixers described above can be used to stir this mixture. In one preferred embodiment, in addition to being closed, the mixing vessel is also leakproof. In one embodiment, the reaction mixture is mixed at a speed of 160 r.p.m. for about 4 hours.

Once all the reagents have been added to mixer 36 and mixed, they may be discharged from mixer vessel 36 and passed via line 38 to drier 40 wherein the slurry is partially dried.

Suitable dryers known to those skilled in the art may be used to dry the slurry. Thus, for example, one may use the dryers described on pages 20-4 to 20-58 of said Perry and Chilton's handbook.

The slurry is partially dried to a moisture content of from about 8 to about 20 percent, by weight. It is preferred to dry the slurry to a moisture content of from about 12 to about 16 percent, by weight.

The partially dried slurry is then pelletized. It may be pelletized by means well known to those skilled in the art. Thus, by way of illustration and not limitaiton, one can use the methods and apparatuses described on pages 8-61 to 8-62 of Perry and Chilton's "Chemical Engineers' Handbook, Fifth Edition. Thus, e.g., one can use the Eirich Machines described above.

In an especially preferred embodiment of this invention, the pellets of this invention are prepared by a wet-mixing process.

Separation of solids by screening and sieving is well known to those skilled in the art and is described, e.g., on pages 21-37 to 21-44 of said Perry and Chilton's Chemical Engineers' Handbook, supra, the disclosure of which is hereby incorporated by reference into this specification. As is known to those skilled in the art, the size of the sieve openings used will dictate what size pellets will be obtained from the dried slurry.

In one preferred embodiment, illustrated in FIG. 1, the partially dried slurry is passed via line 42 to twin vibratory sieve 44, wherein it is pelletized. In this embodiment, two sieves are used to pelletize the slurry and produce the pellets of this invention. The slurry is first passed through a top sieve with sieve openings of from about 8 to about 14 millimeters and, preferably, openings of from about 10 to about 12 millimeters. The slurry which passes through this top sieve is then contacted with a bottom sieve with sieve openings of 4 millimeters. The pellets used in the process of this invention are formed between the top sieve and the bottom sieve.

The material passing through the bottom sieve of twin vibratory sieve 44 can be recycled via line 34 into mixer 36 and reslurried therein.

The pelletized material from sieve 44 is passed via line 46 to drier 48. In the drier, the pellets are dried to a moisture content of from about 0.1 to about 2.0 percent, by weight. In general, the pellets are dried at a temperature of about 80 to about 100 degrees centigrade for about 2 hours.

The dried pellets are transferred via line 50 to reactor 52 which is equipped with an igniter. In one preferred embodiment, in such reactor, the pellets are first subjected to a preignition, low-temperature heat treatment step.

In the preheating step, the dried pellets are then poured into a reactor and preheated while under an atmosphere selected from the group consisting of air, nitrogen, or inert gas. The pellets are preheated to a temperature of from about 200 to about 300 degrees centigrade; it generally takes no longer than about 40 minutes before the pellets reach this temperature. In general, the preheating is conducted for a period of from about 10 to about 40 minutes and, preferably, from about 15 to about 25 minutes. It is preferred to conduct the preheating in an inert atmosphere. Suitable inert gases include argon, helium, and the like. The most preferred inert gas is argon. Mixtures of the above inert gases also can be used.

Once the pellets have been preheated to a temperature of from about 200 to about 300 degrees centigrade, they are ignited. It is preferred that the gas used in the ignition system, which preferably is inert, be at ambient pressure, although slight deviations from ambient pressure are allowable.

In one preferred embodiment, the dried pellets are preheated while under nitrogen atmosphere. In this embodiment, it is preferred to heat the nitrogen to a temperature of about 400 degrees centigrade, pass it into the reactor, and contact it with the pellets in order to preheat them. Thus, nitrogen is fed via line 54 into heater 56 wherein it is heated to a temperature of 400 degrees centigrade and thereafter fed via line 58 into reactor 52 wherein it is contacted with the pellets.

In another embodiment, not shown, the pellets are ignited without being subjected to the preignition low-temperature heat treatment step.

The pellets are then ignited. Any suitable source of heat, such as a spark, a flame, a beam, a hot wire, and the like, can be used to ignite the pellets. In general, the ignition source must be at a temperature of at least about 600 degrees centigrade and, preferably, from about 600 to about 800 degrees centigrade.

Once the pellets have been ignited, they burn spontaneously in a self-sustaining reaction which produces a substantial amount of heat. In general, the reaction wave propagates at a rate of from about 0.1 centimeters per second to about 1.5 centimeters per second. The reaction time is a function of the the amount of pellets being combusted. The reaction temperature is generally from about 1700 to about 2300 degrees centigrade.

In one preferred embodiment, the pellets are ignited with a hot wire. A chromel-alumel hot wire which is red-hot and at a temperature of at least about 800 degrees centigrade is used to ignite the pellets. Once the pellets are ignited, the ignition point is transformed into a reaction front which consumes at a velocity of from about 0.1 and 1.5 centimeters per second.

The reacted pellets are then discharged via line 60 to refractory tray 62, wherein they are allowed to cool under ambient conditions to a temperature of from about ambient to about 200 degrees centigrade room temperature.

The cooled pellets are then passed via line 64 to four-deck vibratory sieve 66. The vibratory sieve 66 preferably has at least four sieves which sequentially screen and/or treat the combusted pellets, and a collecting pan beneath the finest sieve.

The first screen in the vibratory sieve, into which the combusted pellets are first discharged, is 2.5 mesh (8 millimeters sieve opening). Material which passes through this sieve is then passed to the second vibratory sieve.

The second screen in the vibratory sieve is 16 mesh (1 millimeter sieve opening). It is preferred to locate rubber rings in the bottom of said sieve; these rings are solid rubber and are about 1.0 inch in diameter. The rubber rings gently crush the pellet material. Material which passes through the second sieve is passed to the third vibratory sieve.

The third vibratory sieve is 28 mesh (0.6 millimeter opening). The bottom of this sieve also contains 1.0 inch diameter rubber rings to assist in gnetly crushing the pellet material. Material which passes through this third sieve is primarily silicon carbide whisker material and alumina powder and alumina agglomerates, and it passes to the fourth vibratory sieve.

The fourth vibratory sieve is 60 mesh (0.25 millimeter opening). The material which passes through this sieve is collected on the bottom pan. This material is a mixture of dispersed silicon carbide whiskers in alumina powder.

The desired silicon carbide whisker material, which is collected on the pan, is a composite precursor comprised of from 39 to 54 percent of alpha silicon carbide (by weight of silicon carbide and alumina), from about 46 to about 33 percent of alumina, and from 12 to about 15 (by weight of compoxite precursor) of other materials preferably comprised of one or more of silicon oxycarbide, silicon subcarbides, silicon-silicon dioxide solution solutions, aluminum-mono and sub-silicates, and mixtures thereof. A substantial portion of these other materials are convertible to silicon carbide and/or alumina with heat treatment. The silicon carbide material in the composite precursor comprises at least 80 weight percent (by weight of silicon carbide) of silicon carbide whiskers.

If material remains on the first sieve, and/or second sieve, and/or third sieve, it is passed via line 68 to mill 70 where it is ground, preferably together with 0.1 percent (by weight) of oleic acid until it will pass a 325 mesh sieve, and the ground material is then passed via line 18 to ball mill 10. The materials remaining on the first sieve (2.5 mesh), if any, together with the material remaining on the second sieve (16 mesh), if any, and together with the material remaining on the third sieve (20 mesh), if any, can be used as possible moderator material. In case the proportion of remaining material is less than the necessary quantity for moderation, a fraction of the material remaining on the fourth sieve (60 sieve) can be added.

The material passing through the fourth sieve, together with the material accumulated on the bottom pan, is a ceramic composite precursor comprised of silicon carbide whiskers and aluminum oxide powder; it may be hot-pressed into ceramic articles.

In one embodiment, the composite material from the fourth sieve and the bottom pan is passed via line 72 to furnace 74, where it is heat-treated.

HEAT TREATMENT OF THE SILICON CARBIDE COMPOSITE MATERIAL

In one preferred embodiment, the material passing through the fourth sieve is subjected to a thermal conditioning cycle. In this embodiment, the material is introduced into a high-temperature furnace.

Referring to FIG. 1, the composite material from the fourth sieve of vibratory screen 66 is passed via line 72 to tumbler 73 in which the material is tumbled for from about 4 to about 5 hours; as is known to those skilled in the art, a small jar without grinding media may be used as a tumbler. The purpose of the tumbling is to provide a more homogenous composite.

The blended composite material from tumbler 73 is then passed to furnace 74, where it is thermally conditioned. The conditioned material from furnace 74 is thereafter passed via line 76 to vibratory screen 78.

The thermal conditioning treatment occurs in a high-temperature furnace able to reach a temperature in excess of 1,600 degrees centigrade. Such high-temperature furnaces are well known in those skilled in the art and are described, e.g., on pages 606–612 (and in the references cited in these pages) of the McGraw-Hill Encyclopedia of Science & Technology, Volume 5 (McGraw-Hill Book Company, New York, 1977), the disclosures of which are hereby incorporated by reference into this specification.

High-temperature furnace 74 is preferably a grahite furnace containing a graphite heating element or inductive susceptor; and the thermal conditioning treatment is conducted under a protective atmosphere, such as nitrogen, in the absence of oxygen or oxygen-containing gas.

After the composite material is charged to the furnace and the furnace is purged with the protective gas, the material is subjected to a specified heat profile. In one embodiment, the material is insereted into the furnace chamber, the chamber is purged with nitrogen, the furnace chamber is subjected to a vacuum pump until a partial pressure of less than about 150 milliTorr is obtained, and then the material in the furnace is heated from ambient temperature to a temperature of from about 350 to about 500 degrees centigrade at a rate of from about 15 to about 30 degrees per minute. It is preferred to first heat the composite material from ambient conditions to a temperature of from about about 380 to about 450 degrees centigrade. It is even more preferred to heat the composite material to a temperature of from about 400 to about 420 degrees centigrade. In another embodiment, the material is subjected to the same processing conditions with the exception that the vacuum is not applied to the furnace chamber.

After the material has been heated to a temperature of from about 350 to about 500 degrees centigrade, it is maintained at the specified temperature and pressure conditions (if any) for at least about 5 minutes. It is preferred to maintain the material under these conditions for at least about 15 minutes. In general, it is not necessary to maintain the material under these conditions for more than about 30 minutes.

In the second step of the thermal conditioning, the material is raised from its temperature of from about 350 to about 500 degrees centigrade to a temperature of from about 1,250 to about 1,350 degrees centigrade at a rate of from about 15 to about 25 degrees per minute. It is preferred to raise it to a temperature of from about 1,300 to about 1,325 degrees centigrade at a rate of from about 18 to about 22 degrees per minute. Prior to the time the material is raised to the temperature of from about 1,250 to about 1,350 degrees centigrade, the vacuum in the furnace, if any, is removed, protective gas (such as nitrogen) is introduced into the chamber, and a pressure of from about 5 to about 15 pounds per square inch is introduced into the chamber. For the remainder of the thermal conditioning cycle, the furnace chamber is maintained under said pressure of from about 5 to about 15 pounds per square inch and under said protective atmosphere. It is more preferred to utilize a pressure of from about 5 to about 10 pounds per square inch.

Once the material has been subjected to said temperature of from about 1,250 to about 1,350 degrees centigrade, said pressure of from about 5 to about 15 pounds per square inch, and said protective atmosphere, it is maintained under said conditions for at least about 30 minutes. It is preferred to maintain the material under these conditions for from about 30 to about 60 minutes.

In the third stage of the thermal conditioning, the material may be raised from its temperature of from about 1,250 to about 1,350 degrees centrigrade to a temperature of from about 1,650 to about 1,750 degrees centrigrade at a rate of from about 7 to about 15 degrees per minute. Once the material has reached such temperature, it generally is maintained at this temperature for from about 30 to about 90 minutes.

In one preferred embodiment, in this third stage, the material is raised to a temperature of from about 1,650 to about 1,670 degrees centrigrade and, once at this temperature, maintained there for from about 30 to about 40 minutes. The material produced in this embodiment contains at least about 25 percent of silicon carbide whiskers with a length of at least 10 microns. The powdered alumina matrix has a high capability of being sintered. The material is suitable for hot-pressing of small, relatively uncomplicated objects such as, e.g., cutting tools.

In another preferred embodiment, in this third stage, the material is raised to a temperature of from about 1,650 to 1,670 degrees centrigrade and, once at this temperature, is maintained there for from about 40 to about 70 minutes. The material produced by this process contains at least about 25 percent of silicon carbide whiskers with a length of at least about 20 microns. This material is suitable for preparing parts with relatively complicated geometries and/or larger sizes by hot pressing. The material is also suitable for hot, isostatic pressing.

In another preferred embodiment, in this third stage, the material is heated to said temperature of from about 1,650 to about 1,670 degrees centrigrade and is maintained at such temperature for from about 70 to about 90 minutes. The material produced in this embodiment has at least about 25 percent of silicon carbide whiskers with a length of about 20 microns. This material is suitable for hot pressing. Furthermore, this material may be processed by injection molding techniques well known to those skilled in the art.

The injection molding process is well known to those skilled in the art and is described, e.g., on pages 590 to 592 of Brage Golding's "Polymers and Resins," (D. Van Nostrad Company, Inc., Princeton, N. J., 1959), the disclosure of which is hereby incorporated by reference into this specification. Injection molding of ceramic materials is described on pages 373 to 377 of James S. Reed's "Introduction to the Principles of Ceramic Processing," (John Wiley & Sons, New York, 1988), the disclosure of which is also hereby incorporated by reference into this specification.

When injection molding the material described in the last mentioned embodiment, the material is dispersed in a thermoplastic binder, which often includes both thermoplastic material and one or more surfactants. Suitable thermoplastic materials are well known to those skilled in the art and include, e.g., solid paraffins, stearic acid, waxes, and the like. The surfactants used preferably are one or more fatty acids, such as oleic acid. It is preferred to disperse from about 75 to about 92 percent of the composite in from about 8 to about 25 percent of the thermoplastic binder. The thermoplastic slurry is then injected into the mold and usually molded at a viscosity of from about 5 to about 80 centipoise. The thermoplastic slurries can be used with high-pressure injection molding techniques (at pressures of greater than about 400 p.s.i.) or with low-pressure injection molding techniques, often known as hot molding, under low pressure (at pressures of from about 15 to about 400 p.s.i.).

In another embodiment, in this third stage, the material is raised to a temperature of from about 1,670 to about 1,700 degrees centigrade and, once at this temperature, is maintained there for at least about 30 minutes and, preferably, from about 30 to about 60 minutes. In this embodiment, the composite material contains at least about 30 percent of whiskers with a length of at least about 10 microns. This material is suitable for hot pressing and hot isostatic pressing of small parts such as, e.g., cutting tools.

In yet another embodiment, the material is raised to said temperature of from about 1,670 to about 1,700 degrees centigrade and, once at such temperature is maintained there for at least about 70 minutes and preferably from about 70 to about 90 minutes. The material produced in this embodiment is suitable for hot pressing and hot isostatic pressing of larger parts, such as extrusion die parts.

In another embodiment, in this third stage, the material is raised to a temperature of from about 1,700 to about 1,750 degrees centigrade. In one aspect of this embodiment, the material is maintained at this temperature for at least about 30 minutes and preferably from about 30 to about 45 minutes; this material contains at least about 35 percent of silicon carbide whiskers with a length of at least 10 microns and is suitable for hot pressing, hot isostatic pressing, and the production of small and/or medium parts. In another aspect of this embodiment, the material is maintained at this temperature for at least 60 minutes and, preferably, for from about 60 to about 90 minutes; the material so produced contains at least about 35 percent of silicon carbide whiskers greater than 20 microns in length and is suitable for hot pressing, hot isostatic pressing, and the production of large parts such as tiles.

After the material has been subjected to a temperature of from about 1,650 to about 1,750 degrees centigrade for the specified amount of time, it is allowed to cool under controlled conditions at a cooling rate of from about 10 to about 20 degrees per minute until it reaches about 1,000 degrees centigrade. Then the material is allowed to cool to ambient temperature under the protective atmosphere in the furnace. Alternatively, one can induce additional cooling at this stage by cooling means in the furnace.

The cooled material is then discharged via line 76 to vibratory sieve 78. It is preferred that vibratory sieve 78 be substantially identical to vibratory sieve 66. After such sieving, the material is then preferably passed via line 80 to tumbler 82, where it is tumbled for from about 2 to about 6 hours.

In another embodiment, the material from vibratory sieve 66 is subjected to an alternative heat treatment cycle under a high-purity nitrogen atmosphere. In this embodiment, the first two steps of the heat-treatment cycle are identical to those described above. In the third step, however, the material is raised from its temperature of from about 1,250 to about 1,350 centigrade to a temperature of from about 1,750 to about 1,900 degrees centigrade at a rate of about 5 to about 10 degrees per minute. It is preferred to raise the material to a temperature of from about 1,800 to about 1,850 degrees centigrade at a rate of from about 6 to about 8 degrees per minute. After the material has been raised to this elevated temperature, it is maintained at this temperature for from about 90 to about 120 minutes under nitrogen atmosphere. The product obtained on this embodiment is a composite of silicon carbide whiskers in a matrix of aluminum oxynitride powder.

In another embodiment, the composite of silicon carbide whiskers and aluminum oxynitride is subjected to a temperature of from about 1,900 to about 2,100 degrees centigrade for from about 90 to about 120 minutes. This further treatment facilitates the separation of the silicon carbide whiskers (which are converted in part to platelets) from the aluminum oxynitride matrix.

In another embodiment, the composite material from vibratory sieve 78 is subjected to froth flotation in order to separate the aluminum oxide from the silicon carbide whiskers. In this froth flotation separation process, one uses an ionic surfactant which will cause the silicon carbide whiskers to disperse in solution and form a stable suspension while causing the aluminum oxide powder to agglomerate and precipitate.

In one embodiment, any or all of the silicon carbide whisker composites of this invention are formed into shaped bodies with an interstitial porosity of from about 50 to about 80 volume percent, which bodies have sufficient strength to be manipulated and subjected to liquid infiltration of molten metals. The silicon carbide whiskers composite can be formed into such porous body by cold isostatic pressing, by hot die casting under low pressure, or by injection molding. The green bodies so formed are then fired at temperature of about 1,300 to about 1,500 degrees centigrade for from about 1 to about 2 hours. The porous bodies thus formed can then be infiltrated with molten alloy metals such as, e.g., aluminum based alloys, magnesium based alloys, titanium based alloys, nickel based alloys, and the like. The infiltrated bodies represent a class of metal-matrix composites reinforced by a ceramic phase.

In one preferred embodiment, a structural ceramic body with improved fracture toughness, wear resistance, and abrasiveness is provided. In this embodiment, the silicon carbide whisker composite from tumbler 82 is transferred to a mold and subjected to hot-pressing at a temperature of about 1,600 to about 1,700 degrees centigrade and a pressure of from about 200 to about 600 atmospehres. Alternatively, and/or additionally, one may use hot isostatic pressing at a temperature of from about 1,300 to about 1,500 degrees centigrade and pressure of from about 1,000 to about 2,000 atmospheres for from about 30 minutes to about 2.0 hours.

PRESSURE ASSISTED SINTERING OF THE READY TO PRESS COMPOSITE MATERIAL

The thermally conditioned ceramic material made by the procedure described above is a well-dispersed material which generally contains at least about 35 percent (by total weight of composite) of silicon carbide, and alumina. The composite consists essentially of silicon carbide and alumina, i.e., at least about 95 weight percent of the composite consists of silicon carbide and alumina; other ingredients may be present in the composite in minor amouunts. Of the silicon carbide portion, at least 80 percent (by total weight of silicon carbide) is comprised of needle-like, signle crystal silicon carbide whiskers whose diameters are from about 0.5 to about 1.5 microns, whose length is from about 20 to about 200 microns, and whose aspect ratios are form about 40 to about 120. At least about 99 percent of the silicon carbide has the hexagonal structure of alpha silicon carbide. The composite contains less than about 0.1 percent, by total weight of composite, of free carbon and less than about 0.1 weight percent, by total weight of composite, of composite, of silica. The alumina matrix in the composite consists of well-defined hexagonal structure of alpha-alumina. The size distribution of the alumina is such that substantially 100 percent of the alumina particles are between 0.5 and 5.0 microns. The alumina crystal network has a large concentration of defects, making it highly suitable for sintering.

The thermally conditioned composite described above is then subjecte to hot pressing. As is known to those skilled in the art, sintering during the application of external pressure is called hot pressing. See e.g., pages 470–471 of James S. Reed's "Introduction to the Principles of Ceramic Processing," supra. One may use uniaxial hot pressng in a refract manufactured from graphite, stabilized zirconia, or a refractory. One may use hot isostatic pressing.

Any of the hot presses known to those skilled in the art may be used in this process. Thus, e.g., one may use hot presses obtained from Thermal Technology, Inc., Astro Division, 606 Olive Street, Santa Barbara, Calif. 93101. Thus, e.g., one may use hot presses obtained from Vacuum Industries, Inc., 5 Middlesex Avenue, Somerville, MA. 02145.

In the first step of the hot pressing process, the thermally conditioned material is loaded into the refractory die of the press. When the die consists of graphite, it is preferred to line the die with a thin sheet of graphite foil such as "GRAF OIL" (sold by Union Carbide), or with boron-nitride powder such as, e.g., the boron-nitride powder spray sold by the Carborundum Division of Sohio.

Figure 2:
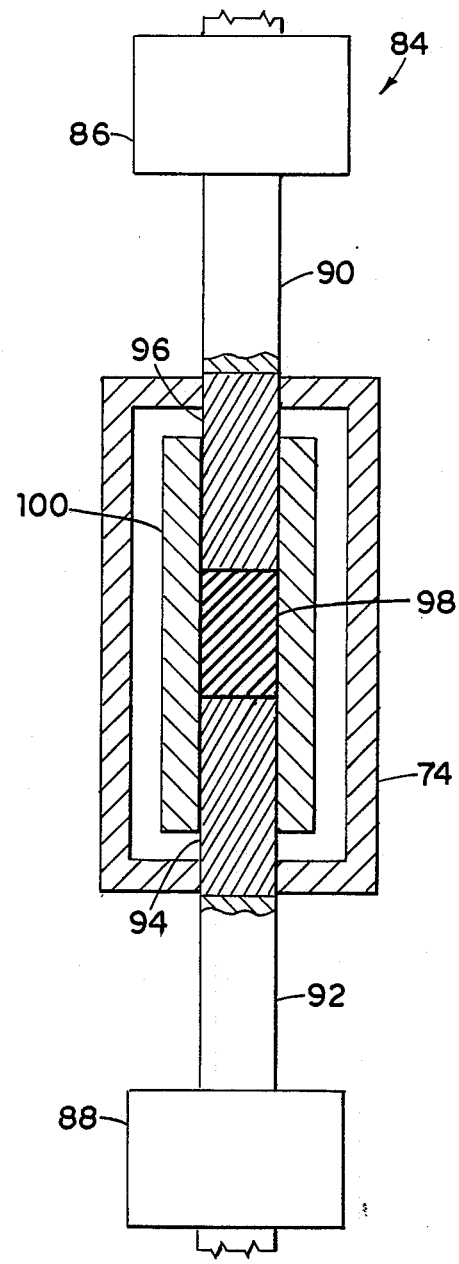
FIG. 2 illustrates one pressing apparatus which may be used in the process of the invention.

One suitable hot-pressing arrangement is illustrated in FIG. 2. Referrng to FIG. 2, hot press apparatus 84 is comprised of hydraulic pumps 86 and 88 which are connected, respectively, to stainless steel plungers 90 and 92 which, preferably, are cooled. Each of plungers 90 and 92 are connected to graphite plungers 94 and 96, which contact and compress the composite material 98. The composite material 98 is disposed within graphite die 100 which, in turn, is disposed within high-temperature furnace 74. As will be apparent to those skilled in the art, other suitable hot-pressing arrangements also can be used.

In one embodiment, while the material is in the die 100, it is preferably pressed at a pressure of from about 50 to 150 pounds per square inch and ambient temperature for at least 30 seconds. The pressure is released, the die is introduced into the furnace, and the heat of the furnace is increased. This initial pressing, although not essential, is useful to eliminate air and oxygen from the powder material.

After the material has been inserted into the furnace, the furnace is preferably evacuated by vacuum pump to a pressure of less than about 150 milliTorr. The furnace chamber is purged with a protective gas such as nitrogen. After the material has been blanketed with nitrogen, the temperature of the material is raised to from about 1,250 to about 1,450 degrees centigrade.

Once the material in the die has reached a temperature of from about 1,250 to about 1,450 degrees centigrade, then the pressure on the material is gradually increased from ambient pressure to from about 25 percent to about 35 percent of the final pressing pressure while the temperature of the material is gradually increased to a temperature of from about 1,650 to about 1,500 degrees centigrade. The final pressing pressure is the highest pressure experienced by the material during the whole pressing cycle, and it generally will range from about 3,000 to about 7,000 pounds per square inch. In general, the pressure and temperature are increased over a period of from about 20 minutes to about 60 minutes.

After the material has been subjected to from about 25 to about 35 percent of the final pressing pressure, and has reached the temperature of from about 1,650 to about 1,900 degrees centigrade, it is maintained under said temperature of from about 1,650 to about 1,500 degrees centigrade for from about 30 to about 90 minutes. During this period, the pressure on the material is increased from 25 to 35 percent of the final pressure to 100 percent of the final pressure. Said increase may be gradual, incremental, or sudden.

After the material has reached the final pressure of from about 3,000 to 7,000 psi and the soak period of the temperature of from about 1,650 to about 1,900 has ended, it may be cooled. It is preferred to subject the material to controlled cooling under nitrogen in the furnace under the same conditions while the pressure on the material is released; the pressure may be released gradually, incrementlly or suddenly. It is preferred to cool the material at a rate of from about 8 to about 15 degrees per minute. The cooling process described in another portion of this specification may be used to cool the material. Alternatively, or additionally, other cooling processes well known to those skilled in the art also may be used.

In one embodiment of this invention, a process is provided in which pellets are prepared from said silica, said aluminium, and said carbon agglomerate in precisely the manner described above with one exception: from about 5 to about 15 weight percent (by total weight of pellet) of a moderator are used to prepare pellets. With the exception of the addition of the moderator prior to pelleteliziing to the silica/aluminum/carbon mixture, every other aspect of the prior process is the same.

In this embodiment, it is is preferred to add from about 8 to about 12 weight percent of the moderator (by total weight of pellet) to the silica/aluminium/carbon mixture. It is most preferred to add about 10 weight percent of the moderator to the mixture.

The moderator is preferably ground with the carbon, the source of metal containing component, and the source of hydrogen fluoride (if any) to prepare the carbon agglomerate. Thereafter, as before, the carbon agglomerate is mixed with the silica slurry and the aluminum.

As indicated above, the moderator may be the silicon carbide whisker/alumina composite. Alternatively, or additionally, the moderator may be a silicon carbide only, alumina only, mixtures of silicon carbide and alumina, other inert materials. Suitable inert materials include, e.g., graphite powder or fiber, and refractory ceramic oxide or non-oxide materials.

Without wishing to be bound to any particular theory, applicant believes that moderation permits control of the reaction and the use of the thermal energy freed during the process. Any possible means of moderation shoul have the capacity of slowing down the reaction rate in some degree and influencing one of the elementary processes of the reaction kinetics (such as the chemical process proper, the diffusion of reactants, nucleation, and crystal growth of products).

Moderation may be achieved by a decrease of the reaction rate caused by a reduction in the surface energy of the reactants. Such a reduction can be caused by increasing grain sizes, covering the grains with a thin layer of inert oxide, or adsorption on the reactant surface of a mono- or poly-molecular layer of a surface-active agent.

Moderation may be achieved by a partial adsorption of the energy generated by the reaction. This absorption can occur in a fluidized-bed reaction with continuous injection and cyclic ignition; in this embodiment, the thermal energy obtained is rapidly removed from the system and can be used for other purposes. This absorption can occur with the introduction of inert substances which do not react with either the reactants or the products but absorb part of the thermal energy released during the reaction; these substances are mixed in the reactant composition and undergo physical transformations (melting or sublimiation) or chemical transformation (decomposition or combustion). This absorption can be effected by introduction of chemically inert substances which do not react with either the reactants or the products but interpose themselves between the reactants.

The moderator substance may act by densifying the reaction product and, by that, reducing the reactant diffusion rate. Alternatively, the moderator may aggregate the more mobile reactant, causing it to diffuse from the interior to the surface of the inert substance and only after that through the product layer to the reaction zone.

Moderation may result from introduction of active substances which enter into weak exothermic or even mildly endothermic reactions with the reaction product. In this case, one may obtain valuable secondary products sintering jointly with the main reaction products. One may create an oxidizing, reducing or inert environment in the course of the reaction, simultaneously increasing the pressure under which the reaction takes place.

Moderators may be grouped according to their reaction mode. Thus, one classification is moderators which leave the system while the reaction is in progress, or those which are readily eliminated after its completion. For example, organic powders that mechanically separate the reactant group from one another may be used (such as, e.g., rubber, resins, etc.); they leave the system entirely while the reaction advances through combusion or volatilization. For example, organic binders which are adsorbed on the surface of the grains may be used (e.g., waxes, higher fatty acids, higher alcohols); they are similarly eliminated. For example, inorganic salts which interpose themselves between reactant groups may be used (e.g., sodium chloride, potassium chloride); they are totally or partially eliminated by decomposition or volatilization, and the residue is readily eliminated by leaching.

Another classification is moderators which do not leave the system. Thus, one may use reaction products that interpose themselves between groups of reactants. This category of moderators remain in the system and may sinter together with reaction products (e.g., alumina). Thus, one may use an excess of metallic oxide; the surplus acts as a moderator; this moderator also remains in the system and may sinter with the products (e.g., excess silica). One may also use compounds which react with the products; thsese secondary products can take part in subsequent sintering processes (e.g., carbon).

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. A process for preparing a composite material comprised of silicon carbide comprising the steps of sequentially:
   (a) providing a composite material comprised of from about 39 to about 54 percent of alpha silicon carbide and from about 46 to about 33 percent of alpha alumina, provided that least about 85 percent of such composite material is selected from the group consisting of alpha silicon carbide, alpha alumina, and mixtures thereof, wherein at least about 80 percent of such silicon carbide is comprised of silicon carbide whiskers;
   (b) raising the temperature of said material to a temperature of from about 350 to about 500 degrees centigrade at a rate of from about 15 to about 30 degrees per minute while subjecting said material to a pressure of less than about 150 millTorr;
   (c) maintaining said material at said temperature of from about 350 to about 500 degrees centigrade for at least about 5 minutes while subjecting said material to a pressure of less than about 150 milliTorr;
   (d) raising said material from said temperature of from about 350 to about 500 degrees centigrade to a temperature of from about 1,250 to about 1,350 degrees centigrade at a rate of from about 15 to about 25 degrees per minute while blanketing said material with an atmosphere which consists of inert gas;
   (e) subjecting said material to said temperature of from about 1,250 to about 1,350 degrees centigrade and a pressure of from about 5 to about 15 pounds per square inch for a period of at least about 30 minutes while blanketing said material with an atmosphere consisting of inert gas;
   (f) raising the temperature of said material to from about 1,650 to about 1,750 degrees centrigrade at a rate of from about 7 to about 15 degrees per minute while subjecting said material to a pressure of from about 5 to about 15 pounds per square inch and while blanketing said material with an atmosphere consisting of inert gas;
   (g) subjecting said material to said temperature of from about 1,650 to about 1,750 degrees degrees centrigrade for from about 30 to about 90 minutes while subjecting said material to a pressure of from about 5 to about 15 pounds per square inch and while blanketing said material with an atmosphere consisting of inert gas; and
   (h) thereafter cooling said material.

2. The process as recited in claim 1, wherein said material is heated to a temperature of from about 380 to about 450 degrees centigrade while being subjected to said pressure of less than about 150 milliTorr.

3. The process as recited in claim 2, wherein said material is heated to a temeperature of from about 400 to about 420 degrees centigrade while being dujected to said pressure of less than about 150 milliTorr.

4. The process as recited in claim 1, wherein said material is maintained at said temperature of from about 350 to about 500 degrees centigrade for at least about 15 minutes.

5. The process as recited in claim 4, wherein the temperature of said material is raised from said temperature of from about 350 to about 500 degrees centrigrade to a temperature of from about 1,300 to about 1,325 degrees at a rate of from about 18 to about 22 degrees per minute.

6. The process as recited in claim 5, wherein, after said material has reached said temperature of from about 1,250 to about 1,350 degrees centigrade and said pressure of from about 5 to about 10 pounds per square inch, it is subjected to said temperature and pressure for from about 30 to about 60 minutes.

7. The processs as recited in claim 1, wherein the temperature of said material is raised to from about 1,650 to about 1,670 degrees centigrade while said material is subjected to pressure of from about 5 to about 10 pounds per square inch.

8. The process as recited in claim 7, wherein said material is subjected to said temperature of from about 1,650 to about 1,670 degrees centigrade and said pressure of from about 5 to about 10 pounds per square inch for from about 30 to about 40 minutes.

9. The process as recited in claim 7, wherein said material is subjected to said temperature of from about 1,650 to about 1,670 degrees centigrade and said pressure of from about 5 to about 10 pounds per square inch for from about 40 to about 70 minutes.

10. The process as recited in claim 7, wherein said material is subjected to said temperature of from about 1,650 to about 1,670 degrees centigrade and said pressure of from about 5 to about 10 pounds per square inch for from about 70 to about 90 minutes.

11. The process as recited in claim 7, wherein the temperature of said material is raised to from about 1,670 to about 1,700 degrees centigrade while said material is subjected to said pressure of from about 5 to about 10 pounds per square inch.

12. The process as recited in claim 11, wherein said material is subjected to said temperature of from about 1,670 to about 1,700 degrees centigrade and said pressure of from about 5 to about 10 pounds per square inch for from about 30 to about 60 minutes.

13. The process as recited in claim 11, wherein said material is subjected to said temperature of from about 1,670 to about 1,700 degrees centigrade and said pressure of from about 5 to about 10 pounds per square inch for from about 70 to about 90 minutes.

14. The process as recited in claim 7, wherein the temperature of said material is raised to from about 1,700 to about 1,750 degrees centigrade while being subjected to said pressure of from about 5 to about 10 pounds per square inch.

15. This process as recited in claim 14, wherein said material is subjected to said temperature of from about 1,700 to about 1,750 degrees centigrade and said pressure of from about 5 to about 10 pounds per square inch for from about 30 to about 45 minutes.

16. The process as recited in claim 15, wherein said material is subjected to said temperature of from about 1,700 to about 1,750 degrees centigrade and said pressure of from about 5 to about 10 pounds per square inch for from about 60 to about 90 minutes.

* * * * *